Sept. 15, 1964 G. C. SUMMERS 3,149,304
SYSTEMS FOR ACOUSTIC VELOCITY LOGGING OF EARTH FORMATIONS
Filed June 8, 1959
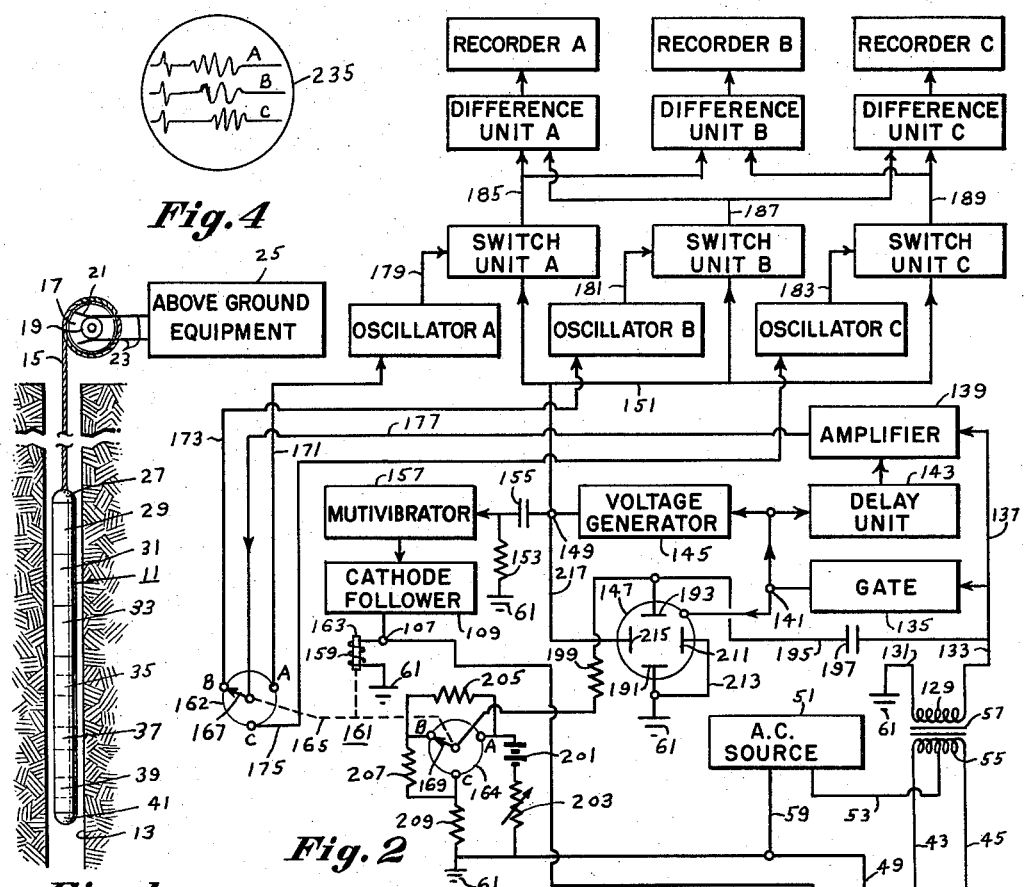
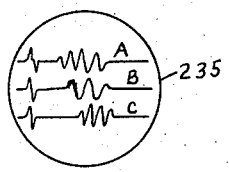
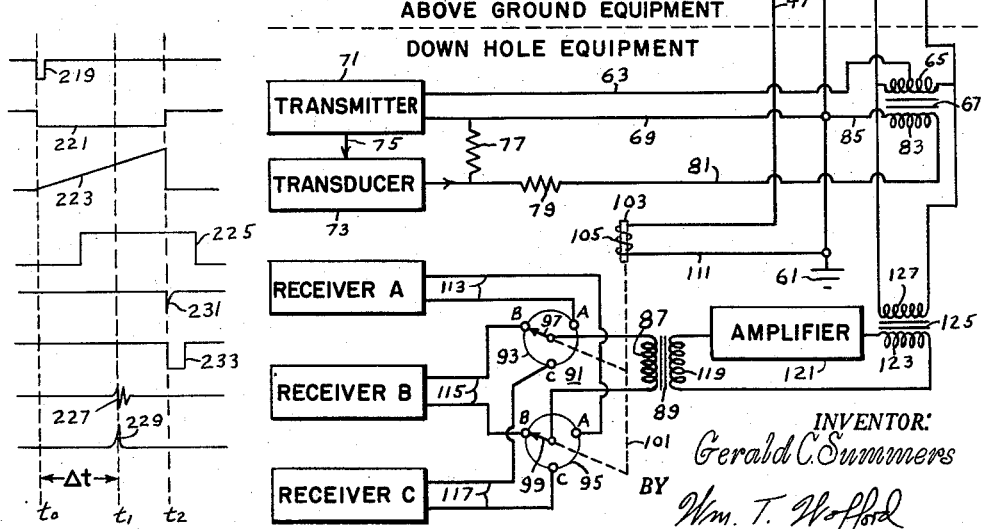
INVENTOR:
Gerald C. Summers
BY Wm. T. Wofford
Attorney

United States Patent Office 3,149,304
Patented Sept. 15, 1964

3,149,304
SYSTEMS FOR ACOUSTIC VELOCITY LOGGING
OF EARTH FORMATIONS
Gerald C. Summers, Dallas, Tex., assignor, by mesne assignments, to PGAC Development Company, Houston, Tex., a corporation of Texas
Filed June 8, 1959, Ser. No. 818,722
17 Claims. (Cl. 340—18)

My invention relates to improved systems for measurement and logging of velocity of compressional wave energy in earth formations, and particularly to the measurement of the velocity of elastic impulses or waves through formations adjacent the walls of a bore hole.

In velocity logging systems it is usual to lower an instrument assembly into the bore hole by means of a wire line or cable which also functions as a transmission line for electric signals. Such cable is commonly made up of one or more conductors surrounded by two layers of counter wound steel armor which may be used as a signal return path. The cable conductors are not shielded relative to each other, or the armor, and they are not transposed. Thus, certain types of signals would suffer severe distortion when transmitted over such cable.

A usual velocity logging system would include in the instrument assembly an elastic impulse transmitter and one or more elastic impulse receivers. The transmitter impulse rate would be at least several impulses per second. With each impulse of the transmitter, a synchronizing pulse would be sent up the cable to above ground equipment. This synchronizing pulse, which is originally a simple uni-directional pulse, is quite distorted by the time it reaches the above ground equipment. In fact, the complexity of the synchronizing pulse limits the minimum time interval that can be tolerated between transmission of the synchronizing pulse and receipt of first energy from the nearest receiver, which limits the minimum spacing between the transmitter and the nearest receiver. The signal energy output of a receiver for each transmitted pulse extends over a relatively long time period because of the many modes by which sound travels in a bore hole, and consequently the first energy will arrive at receivers placed farther from the transmitter before the energy arriving at nearer receivers has subsided. Because of the limitations in transmission characteristics of the cable, and because of the relatively long time interval of received energy for each receiver for each transmitted pulse, and since only the first arrival of energy at each receiver is of interest, it is desireable to devise a loging system wherein energy arriving at a near receiver is in some way cut off before arrival of first energy at other receivers. Also, if each receiver can be cut off as soon as possible after arrival of first energy, then minimum receiver spacing requirements can be greatly reduced.

In the velocity logging art, a log which measures a time interval between transmission of a pulse and receipt of first energy at a receiver, is called a single receiver log. A log which measures the time interval between arrival of first energy at one receiver and the arrival of first energy at a second receiver for the same transmitter impulse is called a dual receiver log. A dual receiver log has certain well known advantages over a single receiver log. Additional advantages are to be gained in some instances by having more than one dual receiver log. One such advantage is the possibility of obtaining a noise-free log. A severe problem, always present in the design of logging equipment, is that of avoiding undue complexity of the equipment, thus keeping size, initial cost, maintenance, and reliability, all within tolerable limits. This problem of course is always magnified when attempts are made to perform more functions and obtain more information, thus producing what is popularly referred to as more "sophisticated" instrumentation. Velocity logging apparatus of the prior art of which I am aware has not proven entirely satisfactory in relation to the considerations above mentioned.

It is accordingly, the general object of my invention to provide improved velocity logging systems.

Another object of my invention is to provide improved velocity logging systems wherein the limitations on receiver spacing are greatly reduced.

Another object of my invention is to provide improved velocity logging systems which are not unduly complex, and yet which are capable of producing one or more dual receiver logs.

Another object of my invention is to provide improved velocity logging systems which offer the possibility of a noise-free log.

Another object of my invention is to provide an improved arrnagement for obtaining simultaneous, visual presentation of a plurality of velocity logs on the screen of a cathode ray tube.

These and other objects are effected by my invention as will be apparent from the following description, taken in accordance with the accompanying drawings, forming a part of this application, in which:

FIG. 1 is a diagrammatic showing of a general layout of a bore hole logging system in which my invention may be utilized;

FIG. 2 is a schematic circuit diagram showing an improved velocity logging system in accordance with a preferred embodiment of my invention;

FIG. 3 is a graph showing a plurality of wave forms to aid in explanation of my invention; and FIG. 4 is a schematic showing of certain wave forms on the screen of a cathode ray tube.

Referring now to the drawings, there is shown in FIG. 1 a logging instrument assembly 11 lowered into a bore hole 13 by means of a cable 15 which is reeled off a conventional cable drum 17 which is powered and controlled by conventional means (not shown). The cable 15, in addition to supporting the instrument assembly 11, has a plurality of conductors, insulated from each other and from the outer sheath. The cable drum shaft is provided with a plurality of slip rings 19, with associated brushes 21, through which electric signals are transmitted to or from the cable conductors and via suitable conductors 23 to components of above ground equipment, indicated generally by the block 25.

The sections of the down-hole instrument assembly as shown by FIG. 1 may include, by way of illustration, reading from top to bottom, a cable head 27, an amplifier and control section 29, an acoustic energy transmitter 31, a transmitter transducer 33, an acoustic receiver section including three receivers 35, 37, 39, and a nose piece 41. The components of the down-hole instrumtent assembly are each built into a length of heavy pipe provided with threaded coupling devices at its ends, as well as suitable electric connector devices. The cable 15 is fixed at its lower end to the cable head 27 which is coupled at its lower end to the uppermost instrument component 29.

In FIG. 2 there is shown a velocity logging system embodying the principles of my invention and in which three dual receiver logs are obtained. The instrument assembly (down-hole equipment) is connected via a conventional three-conductor plus armor cable, the conductors being hereinafter referred to as the first 43, second 45 and third 47 conductors, and the armor as the return conductor 49.

Power is supplied from a conventional alternating current source 51 above ground via one lead 53 connected to the balanced center tap of the secondary winding 55 of a first transformer 57, the free ends of the secondary winding 55 being connected respectively to the first and second cable conductors 43, 45. The other lead 59 for the power source is connected through the return conductor 49 to ground 69. Power is taken off down-hole via one transmitter input lead 63 which is connected to the balanced center tap of the secondary winding 65 of a second transformer 67, the free ends of the secondary winding 65 being connected respectively to the first and second cable conductors 43, 45, and the other transmitter input lead 69 being connected to the cable return conductor 49. Thus, power is supplied down-hole by a phantoming arrangement which is well known in the art, the first and second cable conductors 43, 45 being effectively in parallel for the power frequency.

The transmitter 71 may be a conventional type free-running high-power pulse source such as described in U.S. Patent 2,737,639. Application of power causes the transmitter 71 to emit pulses at a suitable repetition rate, for example, in the range of 15 to 30 pulses per second. These pulses drive a transducer 73 which is connected to the transmitter 71 via output lead 75, thus generating a train of acoustic, or elastic impulses which are coupled by the drilling fluid to the formations adjacent the bore hole 13. The transducer 73 may be of a conventional type, such as described in U.S. Patent 2,722,282. A small portion of the voltage pulse from the transmitter 71 is developed across a first resistor 77 which is connected in series with lead 69 to the return conductor 49. This voltage is applied through a series resistor 79 via lead 81 to one terminal of the primary winding 83 of the second transformer 67, the other terminal being connected via lead 85 to the return conductor 49 which is grounded at 61. This small voltage, hereinafter called the synchronizing pulse, is sent up to the above ground equipment, balanced by the second transformer 67, via the first and second cable conductors 43, 45.

As hereinbefore mentioned, the down-hole instrument in the system of FIG. 2 carries three receivers, hereinafter referred to respectively as receivers A, B, and C. The receivers may be of identical conventional types which function to convert impinging acoustic energy into electric signal form. The receiver outputs are connected in sequence to the primary winding 87 of a first isolation transformer 89 by means of a first solenoid operated stepping switch 91. The stepping switch 91 as shown by FIG. 2 has two sets 93, 95 of fixed contacts with three contacts located 120° apart in each set. There is a movable contact 97, 99 associated with each set, which sweeps the respective fixed contacts in sequential succession. The movable contacts 97, 99 are actuated by means of a mechanical linkage 101 and ratchet mechanism (not shown) which is connected to the solenoid armature 103. The movable contacts 97, 99 move one step each time the solenoid is actuated. The coil 105 of the solenoid is connected on one side to third cable conductor 47, which is in turn connected at the above ground end to the output terminal 107 of a cathode follower 109. The other side of the solenoid coil 105 is connected via lead 111 to ground 61. Receiver A has its output leads 113 connected to contacts A of the stepping switch 91; receiver B has its output leads 115 connected to contacts B of the stepping switch 91; and receiver C has its output leads 117 connected to contacts C of the stepping switch 91. The secondary winding 119 of the first isolation transformer 89 is connected in series with an amplifier 121 and the primary winding 123 of a second isolation transformer 125, the secondary winding 127 of which is connected across the first and second cable conductors 43, 45.

The primary winding 129 of the first transformer 57 has one side connected to ground 61 via lead 131 and the other side is connected via lead 133 to the input of a gate 135, and also via lead 137 to the input of a second amplifier 139. The transmitter synchronizing pulse is utilized to trigger the gate 135, which may be of a conventional type such as that described in my patent, Re. 24,446. The output terminal 141 of the gate 135 is connected to a delay unit 143, and to a voltage generator 145, and also to the intensifier circuit (not shown) of a conventional oscilloscope, the cathode ray tube of which is designated by reference numeral 147. The output of the delay unit 143 is connected to the second, or above ground amplifier 139. The delay unit 143 may be of a conventional type, which functions to delay application of the gate output to turn on the second amplifier 139 until after the synchronizing pulse has passed, thus insuring that the second amplifier output will contain no component of the synchronizing pulse. The voltage generator output terminal 149 is connected to the respective inputs of switch units A, B and C via lead 151. The voltage generator 145 may be of a type which is capable of generating a precision sawtooth waveform, such as the voltage generator described in U.S. Patent, Re. 24,446. The switch units A, B and C may each be like the one described in Re. 24,446 and designated generally therein by reference numeral 32, as will be hereinafter more fully explained. The voltage generator output terminal 149 is also connected through a differentiating network comprising a resistor 153 and capacitor 155, to the input of a mono-stable multivibrator 157. The differentiating network functions to generate a sharp negative pulse at the end of each voltage generator cycle, which pulse serves to trigger the multivibrator 157. The multivibrator may be identical in form to the gate 135. The multivibrator output is connected to the input of the conventional cathode follower 109 hereinbefore mentioned. The cathode follower output terminal 107 is also connected in series with the coil 159 of the solenoid of a second stepping switch 161, to ground 61. The second stepping switch 161 is of the same type as the first stepping switch 91 hereinbefore described. The solenoid armature 163 is connected via a mechanical linkage 165 to a first and second set 162, 164 of fixed contacts. There are three contacts 120° apart in each set, and these are herein designated respectively as contacts A, B and C. The movable contact 167, 169 in each case sweeps the fixed contacts in sequential succession, moving one step each time the solenoid is actuated. In the first set 162, contact A is connected via a lead 171 to the input of an oscillator A; contact B is connected via a lead 173 to the input of an oscillator B; and contact C is connected via a lead 175 to the input of an oscillator C. The movable contact 167 of the first set is connected via lead 177 to the output of the second amplifier 139. Thus the first set 162 of contacts of the stepping switch 161 is utilized to apply the output of the second amplifier 139 successively to the respective oscillators A, B and C. These oscillators are actually of the type known in the art as blocking oscillators and may be each like the blocking oscillator described by Re. 24,446 and designated by reference numeral 31 therein. The outputs of oscillators A, B and C are connected via respective leads 179, 181, 183 to respective switch units A, B and C. The oscillator outputs function to control the switch units, as will be hereinafter more fully explained. The respective outputs of the switch units A, B and C, as will be hereinafter more fully explained, are direct current voltages which have magnitude proportional to the time interval between a transmitted pulse and the first arrival of corresponding acoustic energy at a respective receiver. Each switch unit output could be recorded as a single receiver log. However, because of well known advantages of dual receiver logs, difference units A, B and C are provided. Each difference unit will have an output proportional to the difference (algebraic sum) of two applied voltages. Each difference unit may be a conventional differential amplifier. One such suitable unit is the "Tektronix" Model 53/54D plug-in pre-amplifier. The output of switch unit A is connected via lead 185 to the inputs of difference units A and B; the output of switch unit B is connected via lead 187 to the inputs of difference units A and C; and the output of switch unit C is connected via lead 189 to the inputs of difference units B and C. The output of each difference unit A, B and C is connected to the input of a respective recorder A, B and C to produce three dual receiver logs. Each recorder may be any suitable device for measuring and recording or indicating the output of the respective difference unit. It may, for example, be a conventional potentiometer type strip chart recorder.

The cathode ray tube 147 of the oscilloscope hereinbefore mentioned has one vertical plate 191 connected to ground 61 and the other vertical plate 193 connected via lead 195 through a coupling capacitor 197 to the ungrounded terminal of the first transformer primary winding 129, and also in series with a resistor 199 to the movable contact 169 of the second set 164 of contacts of the second stepping switch 161. Fixed contact A is connected in series with a direct current voltage source, shown as a battery 201, and a variable resistor 203 to ground 61. A second resistor 205 is connected between fixed contacts A and B; a third resistor 207 is connected between contacts B and C. Contact C is also connected through a fourth resistor 209 to ground. The direct current source 201 together with the second, third, and fourth resistors make up a voltage divider from which different levels of voltage may be selected by the movable contact 169, for a purpose to be hereinafter explained. One horizontal plate 211 of the cathode ray tube is connected via lead 213 to ground 61, and the other horizontal plate 215 is connected via lead 217 to the output terminal 149 of the voltage generator 145.

In operation of the acoustic logging system shown by FIG. 2, each time the transmitter 71 fires, an acoustic impulse is put out by the transducer 73. At the same time, a small portion of the transmitter pulse energy is taken as a synchronizing pulse which is developed across resistor 77 and transmitted to above ground via the first and second cable conductors 43, 45, and taken off at the primary winding 129 of the second transformer 57 and is fed via conductor 133 to the gate 135. The synchronizing pulse 219 is shown in FIG. 3 at time $t_0$, which is the time at which it arrives at the gate 135. The gate 135 is a monostable multivibrator, the output of which is indicated at 221 in FIG. 3, beginning at time $t_0$ and extending to time $t_2$. The gate output serves three functions. It acts to turn on the voltage generator 145, the second amplifier 139 and the oscilloscope intensifier circuit (not shown). Thus, at time $t_0$, the voltage generator 145 begins to generate its precision sawtooth waveform, indicated at 223 in FIG. 3. The gate output is applied to the second amplifier 139 through the delay unit 143, which acts to turn the amplifier 139 on only after sufficient time has elapsed for passage of the synchronizing pulse 219, so that the amplifier 139 is blocked insofar as the synchronizing pulse 219 is concerned. The amplifier gate waveform is indicated at 225 in FIG. 3. Also, upon and during application of the gate output, the oscilloscope is ready to look at applied signals.

The acoustic energy which leaves the transmitting transducer 73 will travel in many modes through the drilling fluid and the formations adjacent the bore hole and portions of it will arrive at receivers A, B and C, with the arrival times in each case depending upon the specific mode, the nature of the medium through which it travels, and the spacing of the respective receiver from the transmitting transducer 73. The velocity of sound in earth formations ranges from about 5,000 to 30,000 feet per second, or at the rate of 200 to 33.3 microseconds per foot of travel distance. Since sound will travel faster in the earth formations than in the drilling fluid, first arrival energy at each receiver will always be from the formation. Acoustic energy arriving at each receiver persists over a period of many microseconds, but only the first arrival of acoustic energy at each receiver is of interest in the velocity logging system disclosed herein. In the instant case, the acoustic energy from a given transmitted impulse will arrive first at receiver A, since it is closest to the transmitting transducer 73. However, with the contacts of the first stepping switch 91 in the position shown in FIG. 2, this energy will not be sent above ground, since the contacts A of the sets 93, 95 are open. However, energy arriving at receiver B will be transmitted through contacts B via the first amplifier 121 and the first and second cable conductors 43, 45 to above ground, where it is taken from the primary winding 129 of the first transformer 57 via leads 133 and 137 to the input of the second amplifier 139. The received signals do not affect the gate 135, since it has already been triggered. The received signal will be passed by the amplifier 139 because it arrives at the amplifier after it has been turned on by the delay unit 143. The receiver energy which arrives at the second amplifier 139 is indicated at 227 in FIG. 3. The second amplifier output is conducted via lead 177 and through contact B of set 162 of the second stepping switch 161, and via lead 173 to oscillator B. As hereinbefore stated, oscillator B is a blocking oscillator which functions upon application of an input signal to generate a sharp output pulse. This output pulse is indicated at 229 in FIG. 3. It should be noticed that the oscillator B functions immediately upon arrival of a signal, and so produces its output pulse 229 at a time $t_1$ (see FIG. 3) which represents arrival of first received energy from receiver B. The output pulse 229 from oscillator B is conducted via lead 181 to the control input of switch unit B. As hereinbefore mentioned, reference is made to the switch unit designated by reference numeral 32 in my patent, Re. 24,446, for a detailed explanation of a suitable switch unit. It will suffice here to say that the output of the switch unit B is a direct current voltage of magnitude dependent upon the magnitude of the voltage generator 145 output (degree of rise of the sawtooth waveform 223) at the instant of application of the output pulse of the oscillator B, which is time $t_1$ in FIG. 3. The magnitude of the switch unit output is adjusted each time it receives control pulse. Thus the output voltage of switch unit B is proportional to the difference between time $t_1$ and $t_0$, or delta $t$ of FIG. 3. This is to say that the output of switch unit B is a measure of the time interval between the transmission of an acoustic energy impulse from the transmitting transducer 73 and the receipt of first acoustic energy from that impulse at receiver B (when corrected for the travel time of the synchronizing pulse 219 from the transmitter 71 to the gate 135). During the time interval between successive control signals, the output of switch unit B remains constant.

Now at the end of the cycle of the precision sawtooth 223 generated by the voltage generator 145 (the time at which the waveform returns suddenly from peak magnitude to initial magnitude), which is time $t_2$ in FIG. 3, due to the rapid rate of change of magnitude of the sawtooth waveform 223, the differentiating network 155, 153, will produce a sharp negative pulse. This negative pulse, indicated at 231 in FIG. 3, triggers the multivibrator 157, causing the multivibrator to generate an output pulse which is indicated at 233 in FIG. 3. The multivibrator output pulse 233 is fed through the cathode follower 109 to cause energization of the solenoid coils 105, 159 of the stepping relays 91, 161, so that their movable contacts 97, 99, 167, 169 close on contacts C. The system is now ready for the second synchronizing pulse 219, which is produced by the next firing of the transmitter 71, at which time the system will respond as before, except that it will operate on the acoustic energy arriving at receiver C. At the time corresponding to $t_2$, the stepping switches 91, 161 will be actuated again, making the system ready for the third synchronizing pulse 219. Again the system will respond as before, except that it will operate an acoustic energy arriving at receiver A. One cycle of system operation is thus completed. It is apparent that the system will sample the output of a given receiver once for every three acoustic impulses that are transmitted. Each time a given receiver output is sampled, the corresponding switch unit will adjust its output to correspond with the new value of delta $t$.

If the switch unit outputs were fed directly to corresponding recorders, three single receiver logs would be produced. However, due to well known advantages of dual receiver logs, the outputs of the switch units are fed to the difference units in the manner hereinbefore described so that recorders A, B and C will each produce a dual receiver log.

During operation of the system there is always available on the screen of the cathode ray tube 147 a visual indication of the synchronizing pulse and the corresponding received energy for each receiver A, B and C. A separate trace is produced on the screen 235 of the cathode ray tube for each receiver as indicated by FIG. 4. In FIG. 4 the traces are designated A, B and C to correspond to the associated receiver designation. The second section 164 of the second stepping relay 161 is used to select a different point on the voltage divider hereinbefore mentioned, thus applying a distinct voltage magnitude to the vertical plates 191, 193 of the cathode ray tube 147 for each position of the stepping relays 91, 161. The cathode ray tube 147 is intensified only during the time it is being swept by voltage from the voltage generator 145. This is accomplished by application of the gate 135 output to the intensifier circuit (not shown). Since the stepping switches 91, 161 are actuated after the trace is blank, stepping of the switch and application of the step voltage to the vertical plates occurs at a time when the screen 235 is blank, and values of resistor 199 and capacitor 197 are chosen such that any switching transient introduced will disappear prior to the next sweep.

It should be apparent from the foregoing that I have provided a velocity logging system which is capable of producing a plurality of single or dual receiver logs without undue system or apparatus complexity. Since velocity logging systems in accordance with the principles of my invention, as exemplified by the system of FIG. 2, operate to sample the output of only one of a plurality of receivers per transmitted pulse, and since only the first energy arriving at the receiver being sampled is utilized, the system lends itself to a rapid transmitter pulse repetition rate and is capable of a high degree of time interval discrimination, which means that successive receiver outputs may be sampled quite rapidly, with the overall result that limitations on receiver spacing are greatly reduced.

The velocity logging system disclosed herein further provides the possibility of a noise-free log. In a dual receiver log, malfunction of either receiver, normally caused by noise, causes a malfunction to be recorded, since time difference is the parameter recorded. Usually, in any complete cycle of more than one receiver, only one receiver will malfunction because of noise. In the system of FIG. 2 herein, where three dual receiver logs are produced, such single receiver malfunction would affect two of the logs, but not the third. Thus, there should be one correct log at all times. Only when noise was so bad that malfunction occured oftener than every third transmitted pulse would all logs be incorrect. In all dual receiver logging systems of the prior art of which I am aware, a single malfunction affecting only one receiver causes all recording to be in error.

While I have shown my invention in only one form, it will be obvious to those skilled in the art that it is not so limited, but is susceptible of various changes and modifications without departing from the spirit thereof. For example, more or fewer logs could be obtained by using more or fewer receivers and their associated components in a system such as that herein disclosed. Also, it would be possible to employ a plurality of transmitters and only one receiver. Switching of the transmitters would be accomplished in the same way as herein disclosed for receivers. The mechanical stepping switches might be replaced by a suitable electronic or combination mechanical and electronic system. Various alternative arrangements could be devised for converting switch unit outputs to voltages proportional to different times.

The foregoing disclosure and the showings made in the drawings are merely illustrative of the principles of my invention, and are not to be interpreted in a limiting sense.

I claim:

1. In a system for measuring the acoustic velocity of earth formations adjacent a borehole, the combination of an acoustic pulse transmitter movably positioned in said borehole for generating and transmitting to said formations a train of acoustic pulses and for concurrently generating a train of synchronizing pulses, a generator for producing a signal output waveform the amplitude of which varies monotonically as a function of time for a predetermined time interval, means connected to receive said synchronizing pulses and for initiating generation of said waveform responsive to each said synchronizing pulse, first, second and third acoustic energy receivers movably positioned in said borehole and spaced different fixed distances longitudinally of the borehole from each other and from said transmitter, first, second and third means respectively associated with the first, second and third receivers and responsive to the output of said generator and each acquiring and storing a signal level which is proportional to the instantaneous magnitude of said waveform at the time of arrival of first acoustic energy at the associated receiver, means connecting the output of said generator to all of the last named means, means for connecting the first, second and third receiver outputs to said first, second and third means, signal producing means in circuit with said first, second and third means for generating a plurality of difference signal levels, each said difference signal level being proportional to the algebraic sum of the output signal levels of a different pair of said first, second and third means, and means connected to the signal producing means for recording each of said difference signal levels as a dual receiver log, thereby to produce a plurality of such logs for comparison.

2. The apparatus defined by claim 1 wherein three difference signal levels are produced by said signal producing means and wherein said recording means is effective to develop three dual receiver logs for comparison.

3. In a system for measuring the acoustic velocity of earth formations adjacent a borehole, the combination of a downhole tool including an acoustic pulse transmitter movably positioned in said bore hole for generating and transmitting to said formations a train of acoustic pulses and for concurrently generating a train of synchronizing pulses, surface equipment including a generator for producing a signal output waveform the amplitude of which varies monotonically as a function of time for a predetermined time interval, a cable having at least three inner conductors extending through the borehole and connecting the downhole tool to the surface equipment, an A.C. power supply in the surface equipment connected to said transmitter via a first of said conductors, said sychronizing pulses being applied to said surface equipment via said first conductor and a second of said conductors, means connected to said first and second conductors to receive said synchronizing pulses and for initiating generation of said waveform responsive to each said synchronizing pulse, first, second and third acoustic energy receivers movably positioned in said borehole and spaced different fixed distances longitudinally of the borehole from each other and from said transmitter, first, second and third means respectively associated with the first, second and third receivers and responsive to the output of said generator and each acquiring and storing a signal level which is proportional to the instantaneous magnitude of said waveform at the time of arrival of first acoustic energy from the transmitter at its associated receiver, means connecting the output of said generator to all of the last named means, switch means including a first switch unit in the surface equipment and a second switch unit in the downhole tool for connecting said first, second and third receiver outputs in successive sequence via said first and second conductors to said first, second and third means, said first and second switch units having operating coils electrically connected via a third of said conductors, means in the surface equipment responsive to termination of each said waveform for actuating both units of said switch means, signal producing means in circuit with said first, second and third means for generating a plurality of difference signal levels, each said difference signal level being proportional to the algebraic sum of the output signal levels of a different pair of said first, second and third means, and means connected to the signal producing means for recording as a function of the depth of the downhole tool within the borehole each of said difference signal levels as a dual receiver log, thereby to produce simultaneously a plurality of curves respectively representing the differences in travel times of pulses from the transmitter to different pairs of said receivers.

4. The apparatus defined by claim 3 wherein three difference signal levels are produced by said signal producing means and wherein said recording means is effective to develop three dual receiver logs for comparison.

5. In a system for measuring the acoustic velocity of earth formations adjacent a borehole, the combination of a downhole tool including an acoustic pulse transmitter movably positioned in said borehole for generating and transmitting to said formations a train of acoustic pulses and for concurrently generating a train of synchronizing pulses, surface equipment including a generator for producing a signal output waveform the amplitude of which varies monotonically as a function of time for a predetermined time interval, a cable extending through the borehole and connecting the downhole tool to the surface equipment, said synchronizing pulses being applied to said surface equipment via said cable, means connected to said cable to receive said synchronizing pulses and for initiating generation of said waveform responsive to each said synchronizing pulse, first, second and third acoustic energy receivers movably positioned in said borehole and spaced different fixed distances longitudinally of the borehole from each other and from said transmitter, first, second and third means respectively associated with the first, second and third receivers and responsive to the output of said generator and each acquiring and storing a signal level which is proportional to the instantaneous magnitude of said waveform at the time of arrival of first acoustic energy from the transmitter at its associated receiver, means connecting the output of said generator to all of the last named means, switch means including a first switch unit in the surface equipment and a second switch unit in the downhole tool for connecting said first, second and third receiver outputs in successive sequence to said first, second and third means, said first and second switch units having operating coils electrically connected via said cable, means responsive to termination of each said waveform for actuating both units of said switch means, signal producing means in circuit with said first, second and third means for generating a plurality of difference signal levels, each said difference signal level being proportional to the algebraic sum of the output signal levels of a different pair of said first, second and third means, and means connected to the signal producing means for recording as a function of the depth of the downhole tool within the borehole each of said difference signal levels as a dual receiver log, thereby to produce simultaneously a plurality of curves respectively representing the differences in travel times of pulses from the transmitter to different pairs of said receivers.

6. In a system for measuring the acoustic velocity of earth formations adjacent a borehole, the combination of an acoustic pulse transmitter movably positioned in said borehole for generating and transmitting to said formations a train of acoustic pulses and for concurrently generating a train of synchronizing pulses, a generator for producing a signal output waveform the amplitude of which varies monotonically as a function of time for a predetermined time interval, means connected to receive said synchronizing pulses for initiating generation of said waveform in response to each of said synchronizing pulses, first, second and third acoustic energy receivers movably positioned in said borehole and spaced different fixed distances longitudinally of the borehole from each other and from said transmitter, first, second and third means respectively associated with the first, second and third receivers and responsive to the output of said generator and each acquiring and storing a signal level which is proportional to the instantaneous magnitude of said waveform at the time of arrival of first acoustic energy from the transmitter at its associated receiver, means connecting the output of said generator to all of the last named means, switch means for connecting said first, second and third receiver outputs in successive sequence to said first, second and third means, signal producing means in circuit with said first, second and third means for generating a plurality of difference signal levels, each said difference signal level being proportional to the algebraic sum of the output signal levels of a different pair of said first, second and third means, and means connected to the signal producing means for recording each of said difference signal levels as a dual receiver log, thereby to produce simultaneously a plurality of curves respectively representing the differences in travel times of pulses from the transmitter to different pairs of said receivers.

7. The apparatus defined by claim 6 wherein three difference signal levels are produced by said signal producing means and wherein said recording means is effective to develop three dual receiver logs for comparison.

8. A system for logging the acoustic velocity of earth formations adjacent a borehole comprising means including an acoustic pulse transmitter movably positioned in said bore hole for generating and transmitting a train of acoustic pulses to said formations, means connected to the output of said transmitter for deriving a synchronizing pulse concurrently with each pulse of said train, a gate device, an amplifier means connected to the output of said transmitter for transmitting said synchronizing pulse above ground for application to the input of said gate device and said amplifier, a precision sawtooth voltage generator, a delay unit, circuit means for connecting the output of said gate device to said delay unit and to said voltage generator to initiate generation of a sawtooth waveform, circuit means connecting the output of said delay unit to said amplifier, a plurality of acoustic energy receivers spaced at different distances from said transmitter in said bore hole, a switch unit above ground corresponding to each of said receivers, means for applying the output of said voltage generator to said switch units, a multivibrator, circuit means interposed between said voltage generator and said multivibrator for generating a pulse at the end of the rise time of said sawtooth waveform and for utilizing said pulse to trigger said multivibrator, an above ground stepping switch and a down-hole stepping switch, circuit means connecting the outputs of said receivers to said down-hole stepping switch to connect said receivers in sequential succession to the input of said amplifier, a blocking oscillator for each of said switch units, circuit means connecting the output of said amplifier to said above ground stepping switch to connect said amplifier in sequential succession to said blocking oscillators, means connected to and responsive to the output of said multivibrator for actuating said stepping switches, means connecting the outputs of different ones of said oscillators to respective ones of said switch units, whereby each said switch unit produces an output voltage which is proportional to the time interval between transmission of an acoustic pulse and receipt of first acoustic energy by its corresponding receiver, recording means, and means connecting said recording means to said switch units.

9. A system for measuring the acoustic velocity of earth formations adjacent a borehole, which comprises means including an acoustic pulse transmitter movably positioned in said bore hole for generating and transmitting to said formations a train of acoustic pulses and for concurrently generating a train of synchronizing pulses, a voltage generator responsive to application thereto of one of said synchronizing pulses for producing a voltage that changes monotonically as a function of time following application thereto of said one synchronizing pulse, circuit means connecting a synchronizing pulse from said transmitter to said voltage generator coincident with said transmission of an acoustic pulse to initiate production of said monotonically changing voltage, a plurality of acoustic energy receivers movably positioned in said bore hole in different fixed spaced relations relative to said transmitter, a switch unit above ground corresponding to each of said receivers, each said switch unit comprising a capacitor and a normally open switch for connecting said capacitor to said voltage generator for acquirement by said capacitor of a charge proportional to an instantaneous magnitude of said monotonically changing voltage, circuit means interconnecting a respective receiver and its corresponding switch unit in successive sequential order and responsive to first received acoustic energy from that receiver to momentarily close the switch of the corresponding switch unit to control the charge of said capacitor, and means responsive to the charge on the capacitors of the respective switch units for indicating the acoustic velocity of said formations as said transmitter and receivers are moved longitudinally of said bore hole.

10. A system for measuring the acoustic velocity of earth formations adjacent a bore hole, which comprises an acoustic pulse transmitter movably positioned in said bore hole for generating and transmitting to said formations a train of acoustic pulses and for concurrently generating a train of synchronizing pulses, a generator for producing a signal output waveform the amplitude of which increases linearly as a function of time for a predetermined time interval, means connected to receive said synchronizing pulses and for intitiating generation of said waveform responsive to each said synchronizing pulse, a plurality of acoustic energy receivers movably positioned in said bore hole in different fixed spaced relations relative to said transmitter, a switch unit corresponding to each of said receivers, each of said switch units including means responsive to the output of said generator for acquiring and storing a signal level which is proportional to the instantaneous magnitude of said waveform at the time of arrival of first acoustic energy at the corresponding receiver, means connecting the output of said generator to said switch units, control means associated with each receiver and responsive to arrival of first acoustic energy at its associated receiver for controlling the switch unit corresponding to that receiver to change said signal level upon change in the instantaneous magnitude of said waveform applied thereto upon arrival of first acoustic energy at that receiver, switch means connecting said receiver outputs in successive sequence to their associated control means, means responsive to termination of each said waveform for actuating said switch means, and means responsive to the signal level stored by each switch unit for indicating the acoustic velocity of said formations as said transmitter and receivers are moved longitudinally of said bore hole.

11. A system for measuring the acoustic velocity of earth formations adjacent a bore hole, which comprises an acoustic pulse transmitter movably positioned in said bore hole for generating and transmitting to said formations a train of acoustic pulses and for concurrently generating a train of synchronizing pulses, a generator for producing a signal output waveform the amplitude of which increases linearly as a function of time for a predetermined time interval, means connected to receive said synchronizing pulses and for initiating generation of said wave form responsive to each said synchronizing pulse, three acoustic energy receivers movably positioned in said bore hole in different fixed spaced relations relative to said transmitter, a switch unit corresponding to each of said receivers, each of said switch units including means responsive to the output of said generator for acquiring and storing a signal level which is proportional to the instantaneous magnitude of said waveform at the time of arrival of first acoustic energy at the corresponding receiver, means connecting the output of said generator to said switch units, a plurality of control means each associated with one of said receivers and each responsive to arrival of first acoustic energy at its associated receiver for controlling the switch unit corresponding to that receiver in order to change said signal level upon change in the instantaneous magnitude of said waveform applied thereto upon arrival of first acoustic energy at that receiver, switch means for connnecting the outputs of said receivers in successive sequence to their associated control means, means responsive to termination of each said waveform for actuating said switch means, means responsive to said signal levels for generating three different signal levels, each said difference signal level being proportional to the algebraic sum of the output signal levels of a different pair of said switch units, and means responsive to said difference signal levels for separately recording each said difference signal level as a dual receiver log.

12. A system for measuring the acoustic velocity of earth formations adjacent a bore hole, which comprises an acoustic pulse transmitter movably positioned in said bore hole for generating and transmitting to said formations a train of acoustic pulses and for concurrently generating a train of synchronizing pulses, a generator for producing a signal output waveform the amplitude of which increases linearly as a function of time for a predetermined time interval, means connected to receive said synchronizing pulses and for initiating generation of said waveform responsive to each said synchronizing pulse, a plurality of acoustic energy receivers movably positioned in said bore hole in different fixed spaced relations relative to said transmitter, a switch unit corresponding to each of said receivers, each of said switch units including means responsive to the output of said generator for acquiring and storing a signal level which is proportional to the instantaneous magnitude of said waveform at the time of arrival of first acoustic energy at the corresponding receiver, means connecting the output of said generator to said switch units, a plurality of control means each associated with one of said receivers and each responsive to arrival of first acoustic pulse energy at its associated receiver for controlling the switch unit corresponding to that receiver to change said signal level upon change in the instantaneous magnitude of said waveform applied thereto upon arrival of first acoustic energy at that receiver, stepping switch means including one unit down-hole and one unit above ground connecting said receiver outputs in successive sequence for transmission up-hole over a single conductor pair and then to said control means, means responsive to termination of each said waveform for actuating said switch means, and means responsive to said signal levels for indicating the acoustic velocity of said formations as said transmitter and receivers are moved longitudinally of said bore hole.

13. A system for measuring the acoustic velocity of earth formations adjacent a bore hole, which comprises an acoustic pulse transmitter movably positioned in said bore hole for generating and transmitting to said formations a train of acoustic pulses and for concurrently generating a train of synchronizing pulses, a generator for producing a signal output the amplitude of which increases linearly as a function of time for a predetermined time interval, means connected to receive said synchronizing pulses and for initiating generation of said waveform responsive to each said synchronizing pulse, a plurality of acoustic energy receivers movably positioned in said bore hole in different fixed spaced relations relative to said transmitter, a switch unit corresponding to each of said receivers, each of said switch units including means responsive to the output of said generator for acquiring and storing a signal level which is proportional to the instantaneous magnitude of said waveform at the time of arrival of first acoustic energy at the corresponding receiver, means connecting the output of said generator to said switch units, a plurality of means respectively responsive to the outputs from said receivers and each generating a control pulse responsive to arrival of first acoustic energy at its associated receiver, a plurality of control means each responsive to one of said control pulses for controlling the corresponding switch unit to change its signal level upon change in the instantaneous magnitude of said waveform applied thereto upon arrival of first acoustic energy at the corresponding receiver, switch means for connecting said receiver outputs in successive sequence to said control means, means responsive to termination of each said waveform for actuating said switch means, and means responsive to said signal levels for indicating the acoustic velocity of said formations as said transmitter and receivers are moved longitudinally of said bore hole.

14. A system for measuring the acuostic velocity of earth formations adjacent a bore hole, which comprises an acoustic pulse transmitter movably positioned in said bore hole for generating and transmitting to said formations a train of acoustic pulses and for concurrently generating a train of synchronizing pulses, a generator for producing a signal output waveform the amplitude of which increases linearly as a function of time for a predetermined time interval, means connected to receive said synchronizing pulses and for initiating generation of said waveform responsive to each said synchronizing pulse, a plurality of acoustic energy receivers movably positioned in said bore hole in different fixed spaced relations relative to said transmitter, a switch unit corresponding to each of said receivers, each of said switch units including means responsive to the output of said generator for acquiring and storing a signal level which is proportional to the instantaneous magnitude of said waveform at the time of arrival of first acoustic energy at the corresponding receiver, means connecting the output of said generator to said switch units, means for generating a control pulse responsive to arrival of first acoustic energy at each receiver, control means responsive to each of said control pulses for controlling each switch unit to change its signal level upon change in the instantaneous magnitude of said waveform applied thereto upon arrival of first acoustic energy at the receiver, corresponding to that switch unit, stepping switch means including one unit down-hole and one unit above ground connecting said receiver outputs in successive sequence for transmission up-hole over a single conductor pair and then to said control means, means responsive to termination of each said waveform for actuating said switch means, and means responsive to said signal levels for indicating the acoustic velocity of said formations as said transmitter and receivers are moved longitudinally of said bore hole.

15. A system for measuring the acoustic velocity of earth formations adjacent a bore hole, which comprises an acoustic pulse transmitter movably positioned in said bore hole for generating and transmitting to said formations a train of acoustic pulses and for concurrently generating a train of synchronizing pulses, a generator for producing a signal waveform output the amplitude of which increases linearly as a function of time for a predetermined time interval, means connected to receive said synchronizing pulses and for initiating generation of said waveform responsive to each said synchronizing pulse, a plurality of acoustic energy receivers movably positioned in said bore hole in different fixed spaced relations relative to said transmitter, a switch unit corresponding to each of said receivers, each of said switch units including means responsive to the output of said generator for acquiring and storing a signal level which is proportional to the instantaneous magnitude of said waveform at the time of arrival of first acoustic energy at the corresponding receiver, means connecting the output of said generator to said switch units, means for generating a control pulse responsive to arrival of first acoustic energy a each receiver, control means responsive to each of said control pulses for controlling each switch unit to change its signal level upon change in the instantaneous magnitude of said waveform applied thereto upon arrival of first acoustic energy at the receiver corresponding to that switch unit, stepping switch means including one unit down-hole and one unit above ground connecting said receiver outputs in successive sequence for transmission up-hole over a single conductor pair and then to said control means, an oscilloscope above ground and connected to receive said synchronizing pulses and said receiver outputs, a voltage divider associated with said above ground stepping switch unit to select different voltage levels respectively corresponding to the outputs of said receivers, means connected to said voltage divider for applying the selected voltage level to said oscilloscope to cause the oscolloscope to show a separate trace for each receiver, and means responsive to each signal level for indicating the acoustic velocity of said formations as said transmitter and receivers are moved longitudinally of said bore hole.

16. A system for measuring the acoustic velocity of earth formations adjacent a bore hole, which comprises an acoustic pulse transmitter movably positioned in said bore hole for generating and transmitting to said formations a train of acoustic pulses and for concurrently generating a train of synchronizing pulses, a generator for producing a signal output waveform the amplitude of which varies in a predetermined manner as a function of time for a predetermined time interval, means connected to receive said synchronizing pulses and for initiating generation of said waveform responsive to each said synchronizing pulse, a plurality of acoustic energy receivers movably positioned in said bore hole in different fixed spaced relations relative to said transmitter, a switch unit corresponding to each of said receivers, each of said switch units including means responsive to the output of said generator for aquiring and storing a signal level which is proportional to the instantaneous magnitude of said waveform at the time of arrival of first acoustic energy at the corresponding receiver, means connecting the output of said generator to said switch units, control means responsive to arrival of first acoustic energy at each of said receivers for controlling the corresponding switch unit to change its signal level upon change in the instantaneous magnitude of said waveform applied thereto upon arrival of first acoustic energy at that receiver, switch means connecting the receiver outputs in successive sequence to said control means, means responsive to termination of each said waveform for actuating said switch means, and means responsive to said signal levels for indicating the acoustic velocity of said formations as said transmitter and receivers are moved longitudinally of said bore hole.

17. A system for measuring the acoustic velocity of earth formations adjacent a bore hole, which comprises an acoustic pulse transmitter movably positioned in said bore hole for generating and transmitting to said formations a train of acoustic pulses and for concurrently generating a train of synchronizing pulses, a generator for producing a signal output waveform the amplitude of which increases linearly as a function of time for a predetermined time interval, means connected to receive said synchronizing pulses and for initiating generation of said waveform responsive to each said synchronizing pulse, a pair of acoustic energy receivers movably positioned in said bore hole in different fixed spaced relations relative to said transmitter, a switch unit corresponding to each of said receivers, each of said switch units including means responsive to the output of said generator for acquiring and storing a signal level which is proportional to the instantaneous magnitude of said waveform at the time of arrival of first acoustic energy at the corresponding receiver, means connecting the output of said generator to said switch units, control means responsive to arrival of first acoustic energy at each of said receivers for controlling the corresponding switch unit to change its signal level upon change in the instantaneous magnitude of said waveform applied thereto upon arrival of first acoustic energy at that receiver, switch means connecting the receiver outputs in successive sequence to said control means, means responsive to termination of each said waveform for actuating said switch means, and means responsive to said signal levels for indicating the acoustic velocity of said formations as said transmitter and receivers are moved longitudinally of said bore hole.

References Cited in the file of this patent
UNITED STATES PATENTS

| | | |
|---|---|---|
| Re. 24,446 | Summers | Mar. 25, 1958 |
| 2,722,282 | McDonald | Nov. 1, 1955 |
| 2,737,639 | Summers et al. | Mar. 6, 1956 |
| 2,912,164 | Seevers | Nov. 10, 1959 |
| 2,949,973 | Broding et al. | Aug. 23, 1960 |
| 2,975,399 | Burns | Mar. 14, 1961 |